US012174562B2

(12) United States Patent
Kawai et al.

(10) Patent No.: US 12,174,562 B2
(45) Date of Patent: Dec. 24, 2024

(54) IMAGE FORMING APPARATUS

(71) Applicant: CANON KABUSHIKI KAISHA, Tokyo (JP)

(72) Inventors: Shintaro Kawai, Ibaraki (JP); Katsuya Nakama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 17/936,741

(22) Filed: Sep. 29, 2022

(65) Prior Publication Data

US 2023/0096743 A1 Mar. 30, 2023

(30) Foreign Application Priority Data

Sep. 30, 2021 (JP) ................................ 2021-160971

(51) Int. Cl.
*G03G 15/16* (2006.01)
*G03G 15/00* (2006.01)

(52) U.S. Cl.
CPC ....... *G03G 15/161* (2013.01); *G03G 15/5058* (2013.01); *G03G 15/556* (2013.01); *G03G 2215/1661* (2013.01)

(58) Field of Classification Search
CPC ............. G03G 15/161; G03G 15/5058; G03G 15/556; G03G 2215/1661
See application file for complete search history.

(56) References Cited

U.S. PATENT DOCUMENTS

2019/0310577 A1* 10/2019 Motoyama ......... G03G 15/1605

FOREIGN PATENT DOCUMENTS

| | | | |
|---|---|---|---|
| JP | 2003263027 | A | 9/2003 |
| JP | 2010145676 | A | 7/2010 |
| JP | 2012113249 | A | 6/2012 |
| JP | 2012118423 | A | 6/2012 |

* cited by examiner

*Primary Examiner* — Stephanie E Bloss
*Assistant Examiner* — Michael A Harrison
(74) *Attorney, Agent, or Firm* — Canon U.S.A., Inc. IP Division

(57) ABSTRACT

An image forming apparatus includes an intermediate transfer member, a cleaning member, and an image forming unit having a developer carrier. During an image forming job, when a ratio of an amount of toner consumed to a distance that the developer carrier is rotationally driven is greater than a threshold value, the image forming unit forms a first toner supply image for supplying toner to the cleaning member in a predetermined period that is from a time at which a first toner image is transferred to the intermediate transfer member to a time at which a second toner image is transferred to the intermediate transfer member. When the ratio is less than the threshold value, the image forming unit forms a second toner supply image for supplying toner to the cleaning member in the predetermined period and having a density that is higher than a first toner supply image density.

9 Claims, 7 Drawing Sheets

IMAGE FORMING APPARATUS

BACKGROUND

Field

The present disclosure relates to an image forming apparatus including a developing device that develops an electrostatic image formed on an image carrier.

Description of the Related Art

A developing device includes a developing roller (developer carrier) that carries and conveys toner (developer) to develop an electrostatic image formed on a photoconductor (image carrier). A technique is known (see Japanese Patent Laid-Open No. 2003-263027) for performing a forced toner discharging operation when the toner consumption amount per unit drive time of a developing roller is small (i.e., a low print ratio). The forced toner discharging operation is an operation of forcedly consuming toner by applying a bias to a developing roller to deposit toner carried by the developing roller in a non-image forming region on a photoconductor.

Since toner is forcedly consumed by the forced toner discharging operation and fresh toner is supplied into the developing device, the deterioration of toner circulating in the developing device is suppressed. To increase the efficiency of suppressing the deterioration of toner circulating in the developing device, the increase in the amount of toner forcedly consumed by the forced toner discharging operation is therefore desired.

However, if a sheet-to-sheet time interval in an image forming job is increased for the execution of the forced toner discharging operation, downtime occurs each time the forced toner discharging operation is performed.

If the frequency of execution of the forced toner discharging operation or the period of execution of the forced toner discharging operation is increased for the larger amount of toner forcedly consumed by the forced toner discharging operation, productivity may be lowered.

SUMMARY

The present disclosure provides an image forming apparatus that suppresses deterioration of toner and reduces downtime by changing the density of a toner supply image for supplying toner to a cleaning member for cleaning toner remaining on an intermediate transfer member.

According to an aspect of the present disclosure, an image forming apparatus to execute an image forming job of forming images on a plurality of recording media includes an image forming unit that includes an image carrier on which an electrostatic image is formed, a development container configured to accommodate a developer including toner, and a developer carrier that is rotatable, configured to carry the developer to develop the electrostatic image formed on the image carrier, and configured to form a toner image on the image carrier, an intermediate transfer member that is moveable and configured to receive transfer of the toner image formed on the image carrier by the image forming unit, a cleaning member configured to contact the intermediate transfer member to clean toner remaining on the intermediate transfer member, and a control unit configured to perform control, wherein, when a ratio of an amount of toner consumed in the image forming job to a distance that the developer carrier is rotationally driven in the image forming job is greater than a predetermined threshold value, the control unit controls the image forming unit in the image forming job such that a first toner supply image for supplying toner to the cleaning member is formed in a predetermined period, wherein the predetermined period is from (i) a time at which a first toner image for an image to be formed on a first recording medium is transferred to the intermediate transfer member to (ii) a time at which a second toner image for an image to be formed on a second recording medium subsequent to the first recording medium is transferred to the intermediate transfer member in the image forming job, wherein, when the ratio is less than the predetermined threshold value, the control unit controls the image forming unit in the image forming job such that, a second toner supply image for supplying toner to the cleaning member is formed in the predetermined period, and wherein a density of the second toner supply image is higher than a density of the first toner supply image.

Further features of the present disclosure will become apparent from the following description of exemplary embodiments with reference to the attached drawings.

DESCRIPTION OF THE EMBODIMENTS

Embodiments of the present disclosure will be described in detail below with reference to the accompanying drawings. The following embodiments do not limit the present disclosure within the scope of the appended claims. Not all of the combinations of the features described in the present embodiments are essential to the solutions for the present disclosure. The present disclosure can be implemented in printers, various types of printing apparatuses, copying machines, facsimiles, multifunction peripherals, and other various applications.

First Embodiment

[Configuration of Image Forming Apparatus]

Before the description of features of the present embodiments, the entire configuration of an image forming apparatus will be described.

Figure 1:
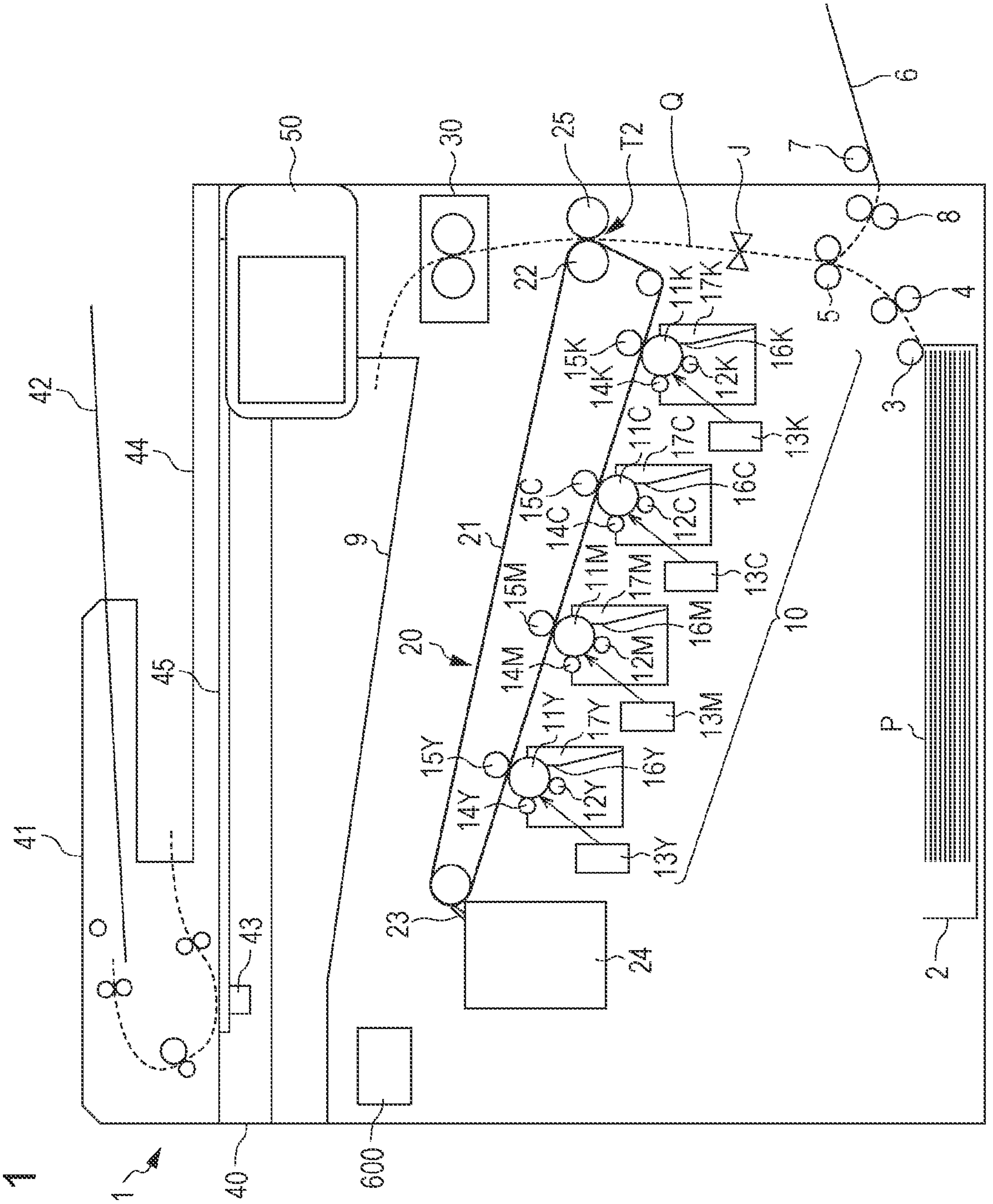
FIG. 1 is a schematic cross-sectional view of an image forming apparatus according to a first embodiment.

FIG. 1 is a schematic diagram illustrating an exemplary cross section of an image forming apparatus. An image forming apparatus 1 forms an image in an image forming unit that uses an electrophotographic process, transfers the formed image onto a sheet P that is a recording medium in a transfer unit, and fixes the image to the sheet P by heating the sheet P on which the image has been transferred in a fixing unit. An image forming apparatus described in the present embodiments is a four-color full-color multifunction printer (color image forming apparatus) that uses an electrophotographic process. Detailed description will be made below.

The image forming apparatus 1 includes a control unit 600 for controlling each unit included therein. The control unit 600 functions as a control unit for performing various controls and performs an image forming operation by comprehensively controlling various components in the image forming apparatus on the basis of an input print information signal (e.g., image data, sheet information, etc.). That is, the image forming apparatus 1 can execute an image forming job of forming a toner image on a recording medium.

The sheet P used for descriptions is a recording medium having a surface on which an image is formed. Examples of the sheet P include plain paper, thick paper, OHP paper, coated paper, label paper, perforated paper.

The image forming apparatus 1 forms a multicolor image by superimposing four-color developers (hereinafter referred to as "toner") of yellow (Y), magenta (M), cyan (C), and black (K).

The image forming apparatus 1 therefore includes image forming stations 10 (image forming units) for forming toner images of respective colors. Although Y, M, C, and K are added as suffixes to reference numerals in the drawing, the image forming stations 10 for respective colors have the same basic configuration. In the description common to the image forming stations for all colors in this specification, the suffixes are omitted. The image forming station 10 includes a rotating drum type photosensitive drum 11 (rotatable image carrier) on which an image is formed. The image forming station 10 also includes a drum cleaning member 16 that is a process unit working on the photosensitive drum 11, a charging roller 12 that is a charger, and a developing unit 14 that is a developing device. A toner chamber (development container) in the developing unit 14 accommodates toner (developer) of a corresponding color that is basically negatively charged. Toner accommodated by the toner chamber is carried and conveyed by a developing roller (rotatable developer carrier) provided in the developing unit 14. The toner carried by the developing roller flies toward the photosensitive drum 11 by the action of a bias applied to the developing roller, so that an electrostatic latent image formed on the photosensitive drum 11 is developed.

A laser scanner unit 13 that is an exposure unit for the photosensitive drum 11 is disposed in the vicinity of the image forming station 10. A cassette 2 for accommodating the sheet P is disposed in a lower part of the laser scanner unit 13. A transfer belt unit (hereinafter referred to as a transfer unit) 20 is provided on the upper side of the image forming station 10.

The transfer unit 20 includes an intermediate transfer belt 21 (intermediate transfer member) and a driving roller 22 for driving the intermediate transfer belt 21. Inside the intermediate transfer belt 21, four primary transfer rollers 15, the first to fourth primary transfer rollers that are primary transfer devices, are disposed parallel to each other. Each of the primary transfer rollers 15 is disposed to face the photosensitive drum 11 in the corresponding image forming station.

A portion of the upper surface of the photosensitive drum 11 in each of the image forming stations 10 for respective colors is in contact with the lower surface of the intermediate transfer belt 21 at a position of the primary transfer roller 15. This contact portion is referred to as a primary transfer unit.

The driving roller 22 is a roller for rotationally driving the intermediate transfer belt 21. A portion of the intermediate transfer belt 21 is backed up by the driving roller 22, and a secondary transfer roller 25 is disposed outside the portion backed up by the driving roller 22. The intermediate transfer belt 21 is in contact with the secondary transfer roller 25 that it a transfer unit, and this contact portion is referred to as a secondary transfer nip portion T2. A portion of the intermediate transfer belt 21 is backed up by a tension roller, and an intermediate transfer belt cleaner 23 (cleaning member) is disposed outside the portion backed up by the tension roller. The intermediate transfer belt cleaner 23 is configured in such a manner that a blade elastic body is pressed against (in contact with) the intermediate transfer belt 21.

The remaining toner on the intermediate transfer belt 21 that has not been transferred on the sheet P in the secondary transfer nip portion T2 is cleaned by the intermediate transfer belt cleaner 23 and collected in a body toner collection box 24. The remaining toner on the photosensitive drum 11 is collected in a toner collection box 17 by the drum cleaning member 16.

The image forming apparatus 1 includes a sheet conveyance device. A sheet conveyance path Q (represented by broken lines in the drawing) that upwardly conveys the sheet P picked up from the cassette 2 is disposed. The sheet conveyance path Q, on which a feeding roller 3, a separation roller pair 4, a registration roller pair 5, a sheet jam detection mechanism J, the secondary transfer roller 25, a fixing unit 30, and a discharge roller pair are disposed in this order from upstream, conveys the sheet P to a discharge tray 9.

The fixing unit 30 that is a fixing device includes a pair of rollers for pressing the sheet P and a heater for heating the sheet P and fuses and fixes an unfixed toner image onto the sheet P by heating the sheet P while pressing the sheet P. The application of a voltage to the surface of the fixing unit 30 prevents toner from being electrically deposited to a fixing roller pair.

The image forming apparatus 1 includes an image reader 40 having the function of reading an image of an original with an optical sensor and converting it into an image signal.

The image forming apparatus 1 also includes a user interface (UI) unit 50 for displaying the state of the image forming apparatus 1 and receiving an input from a user.

[Configuration of Image Forming Control Unit]

A controller 100 for controlling the image forming apparatus 1 will be described in detail with reference to FIG. 2. The controller 100 is an electric circuit 101 including a computation unit such as a CPU, a ROM 102, and a RAM 103. The controller 100 functions as a control unit for performing various controls by causing the CPU circuit portion 101 to read programs stored in the ROM 102 and the RAM 103.

The controller 100 is electrically connected to various components including an external information terminal such as a personal computer 200, an input device such as the image reader 40, and an operation display unit 50 and can exchange signal information with these components. The controller 100 performs an image forming operation by comprehensively controlling various components in the image forming apparatus on the basis of an input print information signal (e.g., image data, sheet information, etc.).

Figure 2:
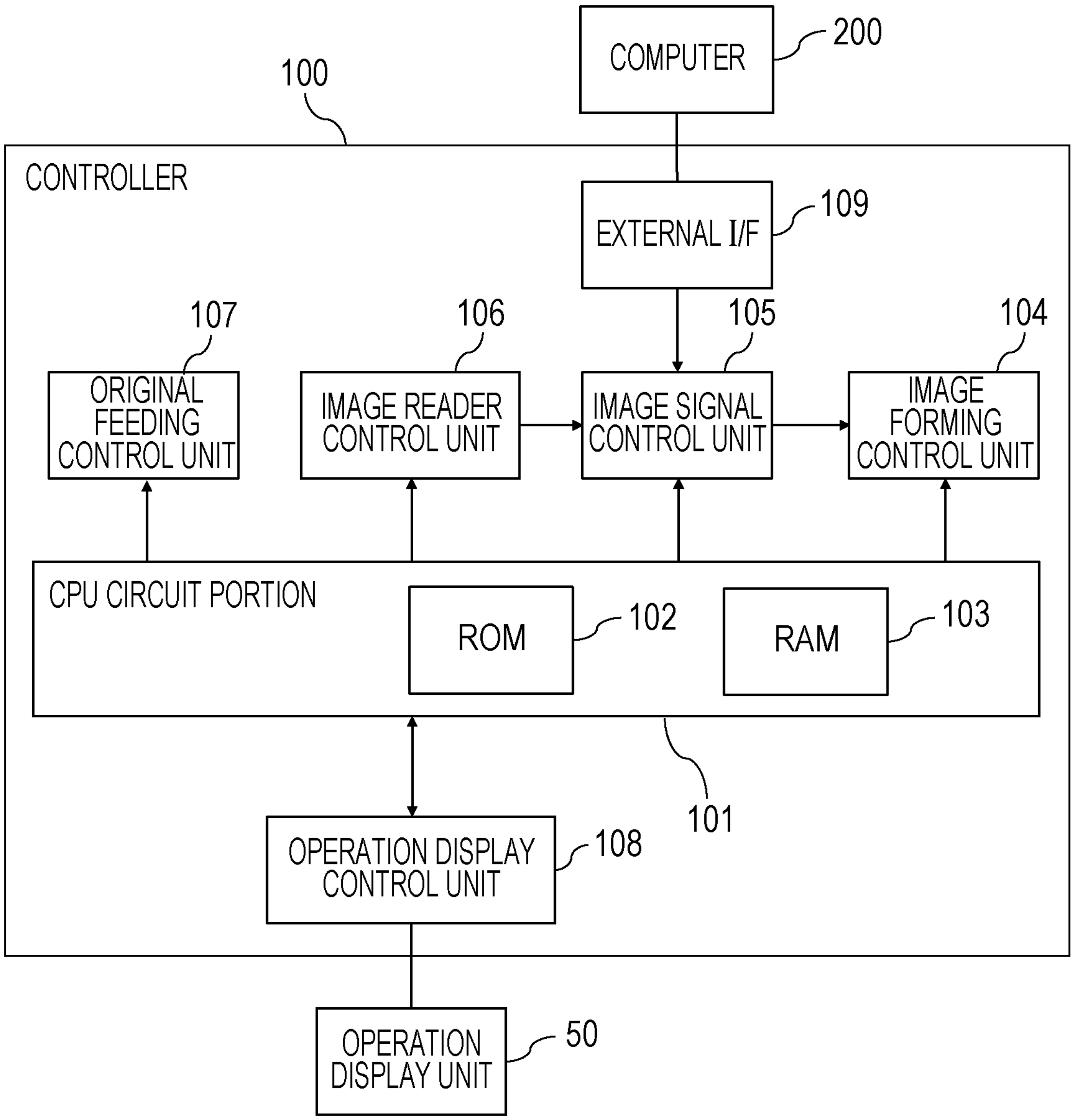
FIG. 2 is a block diagram of a controller according to the first embodiment.

FIG. 2 is a block diagram schematically illustrating the configuration of the controller 100. In the drawing, parts necessary for describing the operation of the present embodiment are mainly illustrated and the illustration of the other parts known as image control units is omitted.

The controller 100 includes the CPU circuit portion 101 as illustrated in FIG. 2. The CPU circuit portion 101 includes a CPU, the ROM 102, and the RAM 103 and comprehensively controls each block (104, 105, 106, 107, 108, and 109) with a control program stored in the ROM 102. The RAM 103 temporarily stores control data and is used as a work area for computation processing performed at that Ime of control.

Next, details of control that the CPU circuit portion 101 performs upon each block will be described.

An original feeding control unit 107 controls the original feeding operation and the original conveyance operation of an original feeding unit 41. An image reader control unit 106 controls the operation of a reader scanner 43 and controls the conversion into an analog image signal. An image signal control unit 105 controls an operation of performing image processing upon an analog image signal converted by the reader scanner 43. Specifically, the image signal control unit 105 performs conversion into a digital image signal, performs image processing upon the digital image signal, converts the digital image signal into a video signal, and then outputs the video signal to an image forming control unit 104. The image signal control unit 105 also controls an operation of performing image processing upon a digital image signal output from the personal computer 200 via an external I/F 109. The image forming control unit 104 controls driving of a constituent component for performing an image forming operation on the basis of the input video signal. In a method of calculating the amount of toner consumption in the first embodiment, a toner remaining amount detection sensor included in the developing unit 14 detects the amount of remaining toner and the image forming control unit 104 calculates the amount of toner consumption on the basis of a result of the detection. There is also a method of causing the image signal control unit 105 to calculate the amount of toner consumption from an image signal. In the present disclosure, both of these methods may be employed.

An operation display control unit 108 exchanges information with the operation display unit 50 and the CPU circuit portion 101. The operation display unit 50 outputs a key signal corresponding to each key operation to the CPU circuit portion 101 and displays corresponding information on the basis of a signal from the CPU circuit portion 101.

[Image Forming Sequence]

When the image forming apparatus 1 performs an image forming operation, the image forming control unit 104 performs the following control upon each constituent component for performing the image forming operation to form a full-color image on the sheet P.

First, the image forming control unit 104 starts to rotationally drive the photosensitive drum 11 in the image forming station 10 and the driving roller 22 in the transfer unit 20 at a predetermined speed in synchronization with an image forming timing. Specifically, the photosensitive drum 11 is driven to rotate clockwise in the drawing, and the driving roller 22 is driven to rotate the intermediate transfer belt 21 in a direction in which the intermediate transfer belt 21 rotates forward with respect to the rotation direction of the photosensitive drum 11 (counterclockwise in the drawing).

Subsequently, an operation control for developing an image on the photosensitive drum 11 for each color is performed in the image forming station 10. Specifically, first, the charging roller 12 uniformly charges the surface of the photosensitive drum 11 with a predetermined potential and polarity. The laser scanner units 13 form electrostatic latent images of respective colors by performing scanning exposure upon the surfaces of the photosensitive drums 11 with laser beams modulated in accordance with image information signals of respective Y, M, C, and K colors. Subsequently, the developing unit 14 forms (develops) a toner image on the photosensitive drum 11 by electrostatically depositing toner on the formed electrostatic latent image.

Subsequently, an operation control is performed for superimposing the toner images formed on the photosensitive drums 11 for respective colors on the intermediate transfer belt 21. Specifically, a predetermined potential is applied to the primary transfer roller 15 facing the photosensitive drum 11 via the intermediate transfer belt 21, and the toner image on the photosensitive drum 11 is electrostatically transferred onto the intermediate transfer belt 21 at the primary transfer unit. By performing this operation for each color, a full-color (the Y color+the M color+the C color+the K color) unfixed toner image is formed on the intermediate transfer belt 21. This unfixed toner image is conveyed to a secondary transfer unit by rotationally driving the driving roller 22. Toner that has not be able to be transferred onto the intermediate transfer belt 21 at the primary transfer unit and has remained on the photosensitive drum 11 is collected in the toner collection box 17 by the drum cleaning member 16.

In parallel with the operation of forming an unfixed toner image on the intermediate transfer belt 21, an operation of feeding a sheet from the cassette 2 is performed. Specifically, the single sheet P is fed by the feeding roller 3 and the separation roller pair 4 and conveyed to the registration roller pair 5 in synchronization with an image forming timing. The sheet P is then conveyed to the secondary transfer unit in synchronization with the unfixed toner image on the intermediate transfer belt 21.

Subsequently, an operation control of transferring an unfixed toner image on the intermediate transfer belt 21 onto the sheet P is performed. Specifically, a secondary transfer bias having a reverse polarity to a regular charging polarity of toner is applied to the secondary transfer roller 25 at the timing when an unfixed toner image and the sheet P are conveyed to the secondary transfer unit, and the unfixed toner image is electrostatically transferred from the intermediate transfer belt 21 to the sheet P (secondary transfer). That is, the sheet P is sandwiched and conveyed by the secondary transfer unit, so that the unfixed toner image is transferred to one surface of the sheet P. Toner that has not be able to be transferred onto the sheet P at the secondary transfer unit and has remained on the intermediate transfer belt 21 is cleaned by the intermediate transfer belt cleaner 23 and is collected in the body toner collection box 24 by the intermediate transfer belt cleaner 23.

When the image forming processing of an original with a low print ratio is often performed in the image forming apparatus 1, the amount of toner that moves from a developing roller in the developing unit 14 to the photosensitive drum 11 generally decreases. When the developing roller in the developing unit 14 continuously rotates for a long period in that state, toner is stirred and conveyed in the developing unit 14. When toner is subjected to stirring and rubbing by a stirring member for supplying toner to a developing roller and to rubbing by a regulating member for regulating the amount of developer on a developing roller, an external additive contained in the toner is detached or an external additive is buried in the surface of the toner. This leads to deterioration of the charging performance and flowability of the toner. As a result, the amount of toner having deteriorated charging performance and flowability increases in a development container and on a developing roller in the developing unit 14 when the image forming processing of an original with a low print ratio continues, and toner tends to easily scatter.

In the first embodiment, a forced toner discharging operation is performed when the toner consumption amount per unit drive time of a developing roller is small (i.e., at the time of a low print ratio). In the forced toner discharging operation, toner is forcedly consumed by applying a bias to a developing roller and depositing toner carried by the developing roller in a non-image forming region on the photosensitive drum 11. Since toner is forcedly consumed by the forced toner discharging operation and fresh toner is therefore supplied in the developing unit 14, the deterioration of toner circulating in the developing unit 14 can be suppressed and the occurrence of toner scattering can therefore be suppressed. Accordingly, in order to improve the efficiency of suppressing the deterioration of toner circulating in the developing unit 14, it is desired that the amount of toner forcedly consumed by the forced toner discharging operation be large.

However, if a sheet-to-sheet time interval in an image forming job is increased and the forced toner discharging operation is performed, downtime occurs each time the forced toner discharging operation is performed. If the frequency of execution of the forced toner discharging operation or the period of execution of the forced toner discharging operation is increased for the increase in the amount of toner forcedly consumed by the forced toner discharging operation, productivity may be lowered. In the first embodiment of the present disclosure, downtime is reduced while the deterioration of toner is suppressed. This will be described in detail below.

[Method of Suppressing Toner Deterioration at the Time of Low-Print-Ratio Printing]

The method of suppressing toner deterioration at the time of low-print-ratio printing that is the feature of the present disclosure will be described in detail below.

Figure 3:
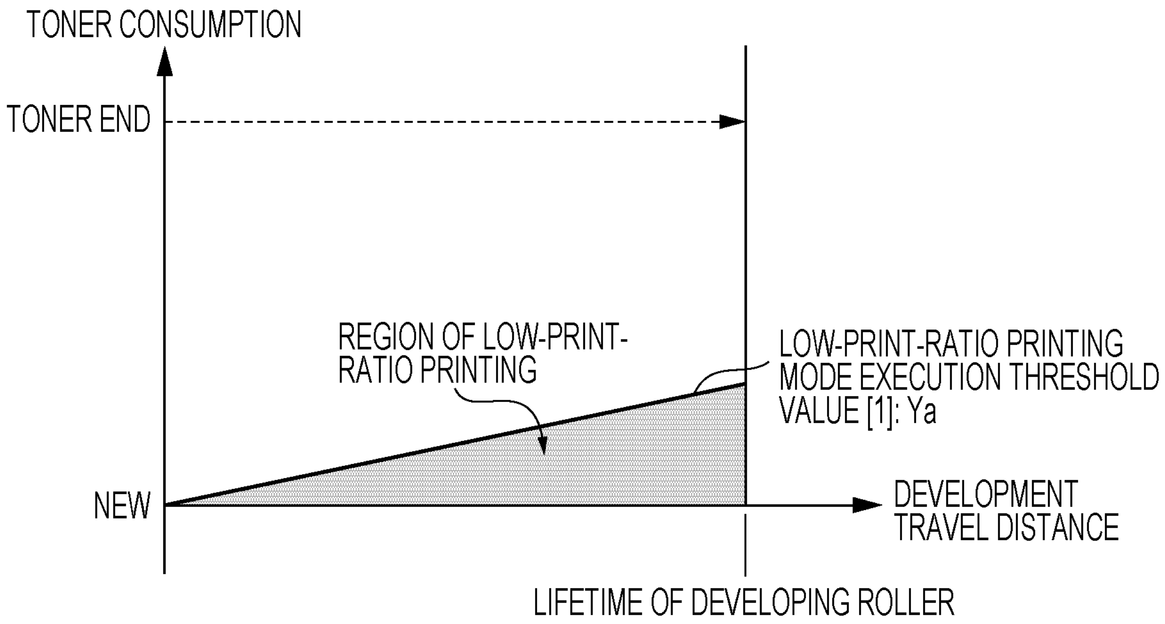
FIG. 3 is a diagram describing a low-print-ratio printing mode execution threshold value [1]: Ya in the first embodiment.

First, for the description of the low-print-ratio printing, the change in the amount of toner consumption with respect to a development travel distance at the time of the low-print-ratio printing will be described with reference to FIG. 3. The development travel distance at the time of the low-print-ratio printing means a distance that a developing roller in the developing unit 14 is rotationally driven while an image with a low print ratio is formed.

In the first embodiment, a region under the change in the amount of toner consumption when an image with an image print ratio of 1% of an A4 sheet size is output: Ya (Y=aX) is defined as the low-print-ratio printing and Ya is defined as a threshold value [1] for the execution of the low-print-ratio printing mode. In the first embodiment, Ya is defined as a threshold value at which toner deterioration progresses and the low-print-ratio printing mode is executed when a value is less than or equal to Ya.

The image forming apparatus 1 according to the first embodiment suppresses the cleaning defect of the intermediate transfer belt cleaner 23 each time one page of an image is output at the time of normal printing. For this, the image forming apparatus 1 according to the first embodiment forms a halftone patch image (main scanning: 220 mm, sub scanning: 5 mm) with a width in the longitudinal direction equivalent to the A4 width and supplies toner to the intermediate transfer belt cleaner 23. The density of this halftone patch image is represented by the area ratio of toner to the total area of a patch image (hereinafter referred to as a toner coverage).

This halftone patch image itself is formed on the intermediate transfer belt 21 after the image formation of one page and is toner consumption means that does not cause the reduction in productivity. Since toner is collected by the intermediate transfer belt cleaner 23 and stored in the body toner collection box 24 having a sufficient volume, the situation where collected toner overflows does not arise.

In the first embodiment, a halftone patch image used to suppress the cleaning defect of the intermediate transfer belt cleaner 23 is also used to increase the amount of toner consumption at the time of the low-print-ratio printing by changing the toner coverage of the halftone patch image.

When the amount of toner consumption with respect to the development travel distance is smaller than or equal to the low-print-ratio printing mode threshold value: Ya, the low-print-ratio printing mode becomes ON. The toner coverage of a halftone patch image (the width of a band is the same as that at the time of normal printing) for the suppression of a cleaning defect is set to j % (i % (i<j) at the time of normal printing), and toner is supplied to the intermediate transfer belt cleaner 23. By increasing the toner coverage of a halftone patch image for the suppression of a cleaning defect, toner deterioration at the time of the low-print-ratio printing is also suppressed. It could be confirmed in the first embodiment that not only a cleaning defect but also toner deterioration at the time of the low-print-ratio printing could be suppressed when i=4 was set at the time of normal printing and j=65 was set at the time of the low-print-ratio printing.

A halftone patch image used in the low-print-ratio printing mode has the same amount of toner consumption as an image with an image print ratio of 1% of A4. Accordingly, in the case where the toner consumption state of the developing unit 14 is under the low-print-ratio printing mode execution threshold value [1]: Ya at which toner deterioration progresses, the amount of toner consumption of an actual printed image is added. The amount of toner consumption larger than that of an image with an image print ratio of 1% of A4 can be achieved because the print ratio of an actual image is added. As a result, the deterioration of toner circulating in a development container in the developing unit 14 can be suppressed and toner scattering can also be suppressed.

Next, an example of control for the low-print-ratio printing mode in the first embodiment will be described with reference to the flowchart in FIG. 4. The control in FIG. 4 is performed by causing a CPU 110 to read a control program stored in the ROM 102 or the RAM 103 and control various components.

Figure 4:
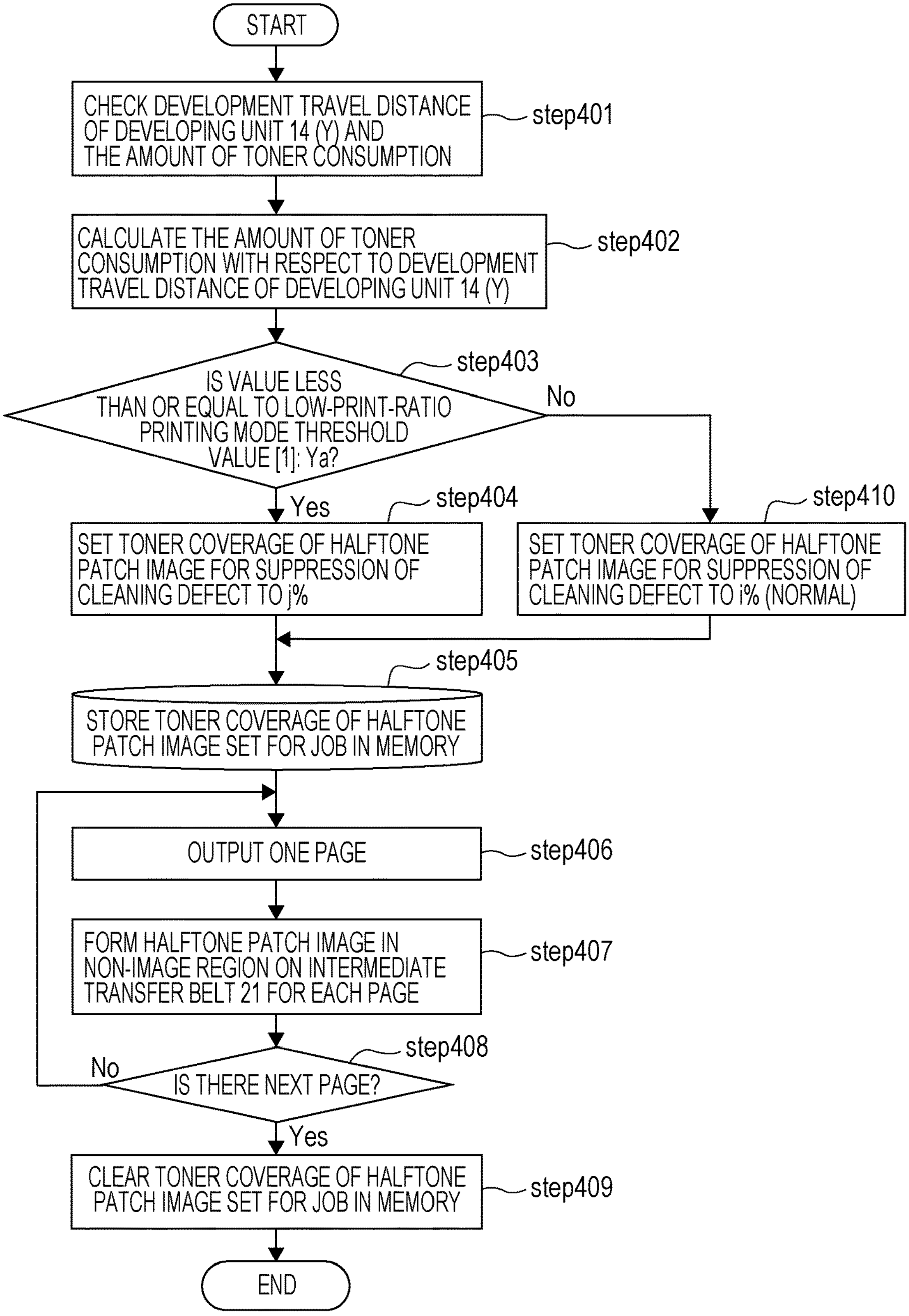
FIG. 4 is a flowchart describing an exemplary control process according to the first embodiment.

The control process illustrated in FIG. 4 starts when a mode is shifted to the low-print-ratio printing mode in response to the CPU 110 receiving an instruction for executing the low-print-ratio printing mode.

At the timing when job data is transmitted from the personal computer 200 and the sheet P is conveyed to the registration roller pair 5, the development travel distance of the developing unit 14 (Y) and the amount of toner consumption are checked (step 401). Subsequently, the image forming control unit 104 calculates the amount of toner consumption with respect to the development travel distance of the developing unit 14 (Y) (step 402). It is checked whether the calculated value is less than or equal to the low-print-ratio printing mode threshold value [1]: Ya (step 403). When the calculated value is less than or equal to Ya, the toner coverage of a halftone patch image for the suppression of a cleaning defect (toner coverage with respect to the area of a patch image) is set to j % (step 404). Subsequently, the toner coverage of a halftone patch image set for the job is stored in a memory (step 405).

One page is output (step 406), and a halftone patch image is formed in a non-image region on the intermediate transfer belt 21 (step 407). When there is the next page (step 408), the process returns to step 406. When there is not the next page (step 408), the toner coverage of a halftone patch image set for the job is cleared from the memory (step 409) and printing (image formation) ends.

When the calculated value is greater than the low-print-ratio printing mode threshold value [1]: Ya (step 403), the toner coverage of a halftone patch image (the toner coverage with respect to the area of a patch image) is set to i % (the toner coverage at the time of normal printing) (step 410). Subsequently, the toner coverage of a halftone patch image set for the job is stored in the memory (step 411). One page is output (step 412), and a halftone patch image is formed in a non-image region on the intermediate transfer belt 21 (step 413). When there is the next page (step 414), the process returns to step 412. When there is not the next page (step 414), the toner coverage of a halftone patch image set for the job is cleared from the memory (step 415) and printing (image formation) ends.

Thus, when a job occurs in the state of low-print-ratio printing in which a calculated value is less than or equal to the low-print-ratio printing mode threshold value [1]: Ya, the toner coverage of a halftone patch image for the suppression of a cleaning defect is set to j %. As a result, the amount of toner consumption that exceeds the change in the amount of toner consumption when an image with an image print ratio of 1% of A4 is output: Ya can be achieved, and toner deterioration can be suppressed.

This halftone patch image itself for cleaning is formed on the intermediate transfer belt 21 after the image formation of one page and is toner consumption means that does not cause the reduction in productivity. Since toner is collected by the intermediate transfer belt cleaner 23 and stored in the body toner collection box 24 having a sufficient volume, the situation where collected toner overflows does not arise.

The switching between halftone patch images for the suppression of a cleaning defect is performed for each job as above. However, it may be checked for each page whether the image forming apparatus is in the low-print-ratio printing state in which a value is less than or equal to the low-print-ratio printing mode threshold value [1]: Ya, and the toner coverage of a halftone patch image may be changed on the basis of a result of the checking.

In the first embodiment described above, the controller 100 controls the image forming station 10 such that, at the time of execution of an image forming job, a halftone patch image is formed in a non-sheet passing region on the intermediate transfer belt 21 after an image for forming a toner image on a recording medium. The halftone patch image is a patch image for supplying toner to the intermediate transfer belt cleaner 23. At that time, the controller 100 changes the density of a halftone patch image on the basis of the amount of toner consumption (pixel count) with respect to the travel distance of a developing roller. Specifically, the controller 100 controls the image forming station 10 such that a halftone patch image with a first density is formed when the pixel count is the first amount of consumption. On the other hand, the controller 100 controls the image forming station 10 such that a halftone patch image with a second density higher than the first density is formed when the pixel count is the second amount of consumption smaller than the first amount of consumption. As a result, downtime can be reduced while the deterioration of toner is suppressed.

Second Embodiment

Different parts from the first embodiment will be described in the second embodiment, and the other basic configuration is common in the first and second embodiments.

In the above-described first embodiment, there is the advantage of not reducing productivity because only the first toner discharging means consumes toner, but a halftone patch image formed in the non-image region on the intermediate transfer belt 21 is in contact with the secondary transfer roller 25. The higher the density of a halftone patch image, the higher the degree of contamination of the secondary transfer roller 25 that leads to the backside contamination of the sheet P. Accordingly, only the increase in the density of a halftone patch image may cause the contamination of the secondary transfer roller 25.

In the second embodiment, toner discharging means of two types consumes the amount of toner equivalent to Ya (Y=aX) to suppress the deterioration of toner in a low-print-ratio printing state. This will be described in detail. Note that parts not described below are the same as those in the first embodiment.

A difference from the first embodiment is that the degree of contamination of the secondary transfer roller 25 caused by a patch image is reduced as much as possible by reducing the toner coverage of a halftone patch image for cleaning from j % to k % (j>k). The amount of toner consumption is therefore reduced. When a value reaches an extremely-low-print-ratio printing threshold value [2]: Yb (Y=aX−b) in the second embodiment, the deterioration of toner is suppressed by performing the forced toner discharging operation.

When the toner coverage of a halftone patch image for cleaning is j %, the amount of toner consumption equivalent to the amount of toner consumption with the image print ratio of 1% of A4 can be achieved. When the toner coverage of a halftone patch image for cleaning is k %, the amount of toner consumption equivalent to the amount of toner consumption with the image print ratio of 0.6% of A4 can be achieved.

In the forced toner discharging operation, an image formation operation is stopped, the transfer unit 20 is made apart from the photosensitive drum 11 in the image forming station 10 for each color, and the image forming control unit 104 forcedly turns on the entire region of the laser scanner unit 13. A solid image is formed as a result of this operation, and the image forming station 10 operates to form a toner images. The toner image formed on the photosensitive drum 11 is collected in the toner collection box 17 by the drum cleaning member 16.

A toner consumption method of toner discharging means in a low-print-ratio printing state that is the feather of the present embodiment will be described in detail below.

First, a forced toner discharging execution threshold value [2]: Yb in an extremely-low-print-ratio printing state in the second embodiment will be described with reference to FIG. 5. A forced toner discharging execution threshold value [2]: Yb has the same inclination: a as the low-print-ratio printing threshold value [1]: Ya (Y=aX) and is obtained by shifting the threshold value [1] downward by the amount of toner consumption: b at the time of one-time execution of forced toner discharging. The value of Y=aX−b is set as the forced toner discharging execution threshold value [2]: Yb. A mechanism is employed for setting the state of the developing unit 14 (Y) back to Ya when the developing unit 14 (Y) reaches the forced toner discharging execution threshold value [2]: Yb by executing forced toner discharging once.

Figure 5:
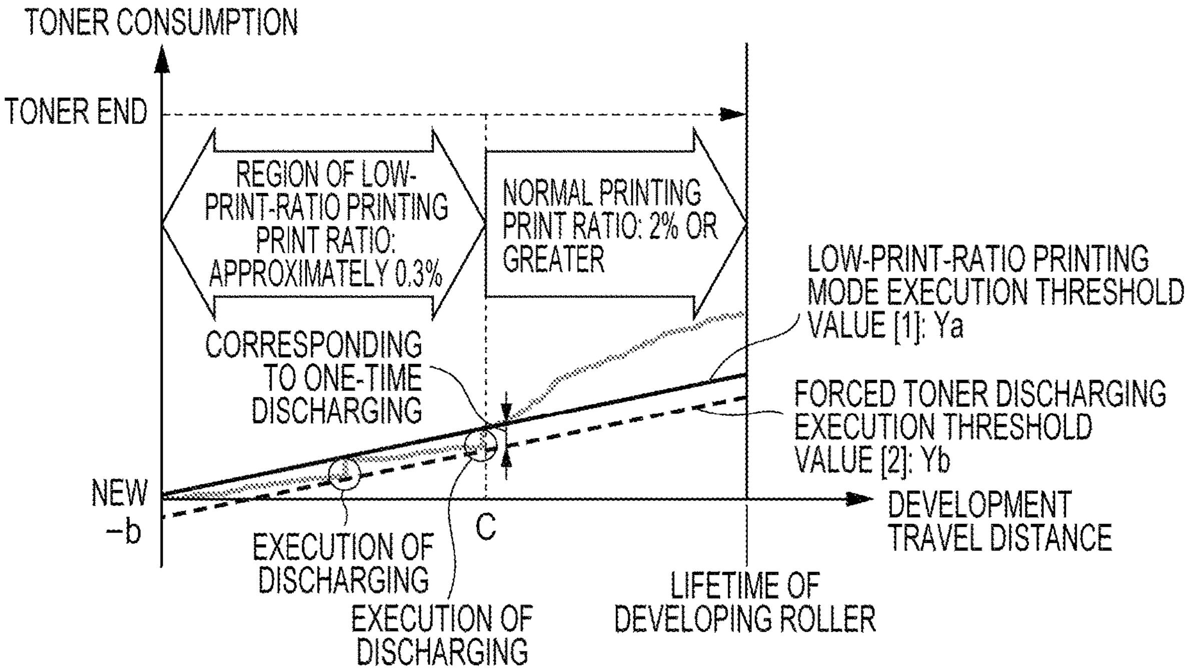
FIG. 5 is a diagram describing a low-print-ratio printing mode in a second embodiment.

As illustrated in FIG. 5, in the case of a user who outputs many images with an extremely low print ratio (printing of an image with an image print ratio of 0.3% or less of A4 is specified as extremely-low-print-ratio printing in the second embodiment), the transition of the amount of toner consumption equal to or less than the low-print-ratio printing mode execution threshold value [1]: Ya is made and the low-print-ratio printing mode becomes ON. The toner coverage of a halftone patch image for the suppression of a cleaning defect that is the first toner discharging means described in the first embodiment is changed from i % (toner coverage at the time of normal printing) to k %. In the second embodiment, the toner coverage of a patch image is lowered from j % in the first embodiment to k % for the suppression of contamination of the secondary transfer roller 25 caused by a patch image. Accordingly, when extremely-low-print-ratio printing continues, the developing unit reaches the forced toner discharging execution threshold value [2]: Yb that is the extremely-low-print-ratio printing state and the forced toner discharging is performed. The amount of toner consumption returns to Ya as a result of execution of the forced toner discharging. Subsequently, when extremely-low-print-ratio printing continues, the developing unit reaches the forced toner discharging execution threshold value [2]: Yb and the forced toner discharging operation is performed as above.

Subsequently, when the development rotation distance is c, the state returns to normal printing (the image print ratio or 2% or greater of A4). When the amount of toner consumption with respect to a development rotation distance is greater than or equal to the low-print-ratio printing mode execution threshold value [1]: Ya, the low-print-ratio printing mode becomes OFF. The toner coverage of a halftone patch image for the suppression of a cleaning defect that is the first toner discharging means is also set back to i % for normal printing, and printing continues.

In the second embodiment, the toner coverage of a halftone image for the suppression of a cleaning defect is raised to a degree that the contamination of the secondary transfer roller 25 does not occur to suppress toner deterioration in extremely-low-print-ratio printing too. It could be confirmed in the second embodiment that not only a cleaning defect but also toner deterioration in extremely-low-print-ratio printing could be suppressed when i=4 was set at the time of normal printing and k=40 was set at the time of low-print-ratio printing.

The amount of toner consumption with respect to a development rotation distance used in the low-print-ratio printing mode in the second embodiment is equivalent to the amount of toner consumption with the image print ratio of 1% of A4. As a result, the deterioration of toner circulating in a development container in the developing unit 14 can be suppressed and the occurrence of toner scattering can also be suppressed.

Figure 6:
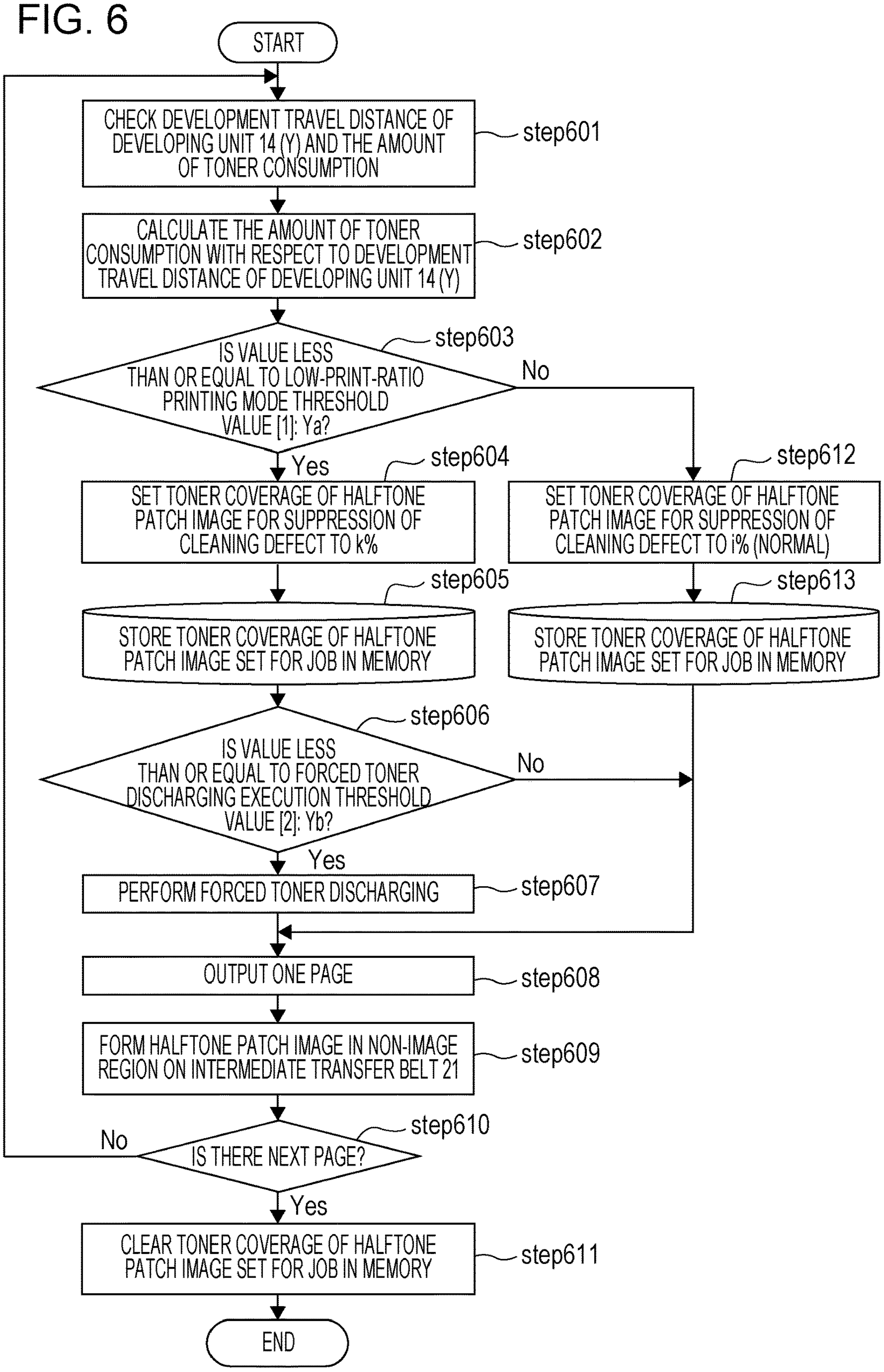
FIG. 6 is a flowchart describing an exemplary control process according to the second embodiment.

Next, an example of control for the low-print-ratio printing mode in the second embodiment will be described with reference to the flowchart in FIG. 6. The control in FIG. 6 is performed by causing the CPU 110 to read a control program stored in the ROM 102 or the RAM 103 and control various components.

At the timing when job data is transmitted from the personal computer 200 and the sheet P is conveyed to the registration roller pair 5, the development travel distance of the developing unit 14 (Y) and the amount of toner consumption are checked (step 601). Subsequently, the image forming control unit 104 calculates the amount of toner consumption with respect to the development travel distance of the developing unit 14 (Y) (step 602). It is checked whether the calculated value is less than or equal to the low-print-ratio printing mode threshold value [1]: Ya (step 603). When the calculated value is less than or equal to Ya, the toner coverage of a halftone patch image (toner coverage with respect to the area of a patch image) is set to k % (step 604). Subsequently, the toner coverage of a halftone patch image set for the job is stored in a memory (step 605). Subsequently, it is checked whether the value is less than or equal to the forced toner discharging execution threshold value [2]: Yb for the extremely-low-print-ratio output (step 606). When the value is less than Yb, the forced toner discharging is immediately performed (step 607) and the one page is output (step 608). When the amount of toner consumption is greater than Yb, one page is output without the execution of the forced toner discharging (step 608). After the output of one page (608), a halftone patch image is formed in the non-image region on the intermediate transfer belt 21 (step 609). When there is the next page (step 610), the process returns to step 601. When there is not the next page (step 610), the toner coverage of a halftone patch image set for the job is cleared from the memory (step 611) and printing (image formation) ends.

When the value is greater than the low-print-ratio printing mode threshold value [1]: Ya (step 603), the toner coverage of a halftone patch image (toner coverage with respect to the area of a patch image) is set to i % (the toner coverage at the time of normal printing) (step 612). Subsequently, the toner coverage of a halftone patch image set for the job is stored in the memory (step 613). Subsequently, one page is output (step 608), and a halftone patch image is formed in the non-image region on the intermediate transfer belt 21 (step 609). When there is the next page (step 610), the process returns to step 601. When there is not the next page (step 610), the toner coverage of a halftone patch image set for the job is cleared from the memory (step 611) and printing ends.

Thus, when a job occurs in the state of low-print-ratio printing in which a calculated value is less than or equal to Ya, the toner coverage of a halftone patch image for the suppression of a cleaning defect is set to k %. As a result, the amount of toner consumption equivalent to the amount of toner consumption when an image with the image print ratio of 0.6% of A4 is output can be achieved each time one page is output. By changing the toner coverage of a halftone patch image from j % in the first embodiment to k %, the contamination of the secondary transfer roller 25 caused by a patch image can be reduced. When the value reaches the forced toner discharging execution threshold value [2] because of the reduction in the amount of toner consumption, the amount of toner consumption can be returned to Ya by performing the forced toner discharging operation. The deterioration of toner caused by low-print-ratio printing can therefore be suppressed.

Since the forced toner discharging operation is performed in the state where the image formation operation is temporarily stopped, this affects productivity. However, the amount of toner consumption can be returned to the threshold value for low-print-ratio printing with certainty while the contamination of the secondary transfer roller 25 caused by a halftone patch image for the suppression of a cleaning defect is suppressed.

The deterioration of toner can be suppressed while the contamination of the secondary transfer roller 25 is suppressed.

This halftone patch image itself for cleaning is formed on the intermediate transfer belt 21 after the image formation of one page and is toner consumption means that does not cause the reduction in productivity. Since toner is collected by the intermediate transfer belt cleaner 23 and stored in the body toner collection box 24 having a sufficient volume, the situation where collected toner overflows does not arise.

The switching between halftone patch images for the suppression of a cleaning defect is performed for each job as above. However, it may be checked for each page whether the image forming apparatus is in the low-print-ratio printing state in which a value is less than or equal to the low-print-ratio printing mode threshold value [1]: Ya, and the toner coverage of a halftone patch image may be changed on the basis of a result of the checking.

Third Embodiment

Different parts from the second embodiment will be described in the third embodiment, and the other basic configuration is common in the second and third embodiments.

The exemplary case has been described in the above-described second embodiment where the forced discharging operation is performed between sheets in an image forming job as needed. On the other hand, the productivity improvement of an image forming apparatus is particularly needed in current years. For further productivity improvement, a sheet-to-sheet time interval needs to be reduced. Time taken to perform the forced discharging operation therefore constitutes a constraint on productivity improvement. Accordingly, a method is considered of performing the forced discharging operation at the time of post rotation after the completion of a job instead of performing the forced discharging operation between sheets.

In general, the image forming stations 10 for respective colors are configured to be started or stopped as needed in the image forming apparatus 1. For example, when a black monochrome image is formed, control processing is performed such that the image forming stations 10 for Y, M, and C are stopped. When a full-color image is formed, control processing is performed such that all of the image forming stations 10 for Y, M, C, and K are started. The reason why the image forming stations 10 other than the image forming station 10 for K, which are not used for image formation, are stopped at the time of image formation of a black monochrome image is as follows. By not driving the unused image forming station 10, the lifetime of the developing unit 14, the photosensitive drum 11, and members for driving these components is increased and the amount of useless power consumption is reduced.

The case will be considered where a job for a full-color image and a job for a monochrome image are mixed and performed with such a configuration. During the formation of a full-color image, all of the image forming stations 10 for Y, M, C, and K are started for image formation. Subsequently, at a timing when a monochrome image is formed, the image forming stations 10 for Y, M, and C other than the image forming station 10 for K are stopped. When the job is completed in this state and the shift to post rotation is made, the image forming stations 10 for Y, M, and C other than the image forming station 10 for K remain at rest. In this state in which the image forming stations 10 for Y, M, and C remain at rest, the forced toner discharging operation for Y, M, and C cannot be performed as needed.

The third embodiment is described next. In the third embodiment, when the forced toner discharging operation for a color is needed at the time of completion of a job and the image forming station 10 for the color is in a shutdown state, the image forming station 10 for the color is started at the time of rotation subsequent to the job and the forced toner discharging operation is performed after the startup.

A method of adjusting the density of a halftone patch image in a low-print-ratio printing state and a forced toner discharging method in the third embodiment will be described in detail below.

Figure 7:
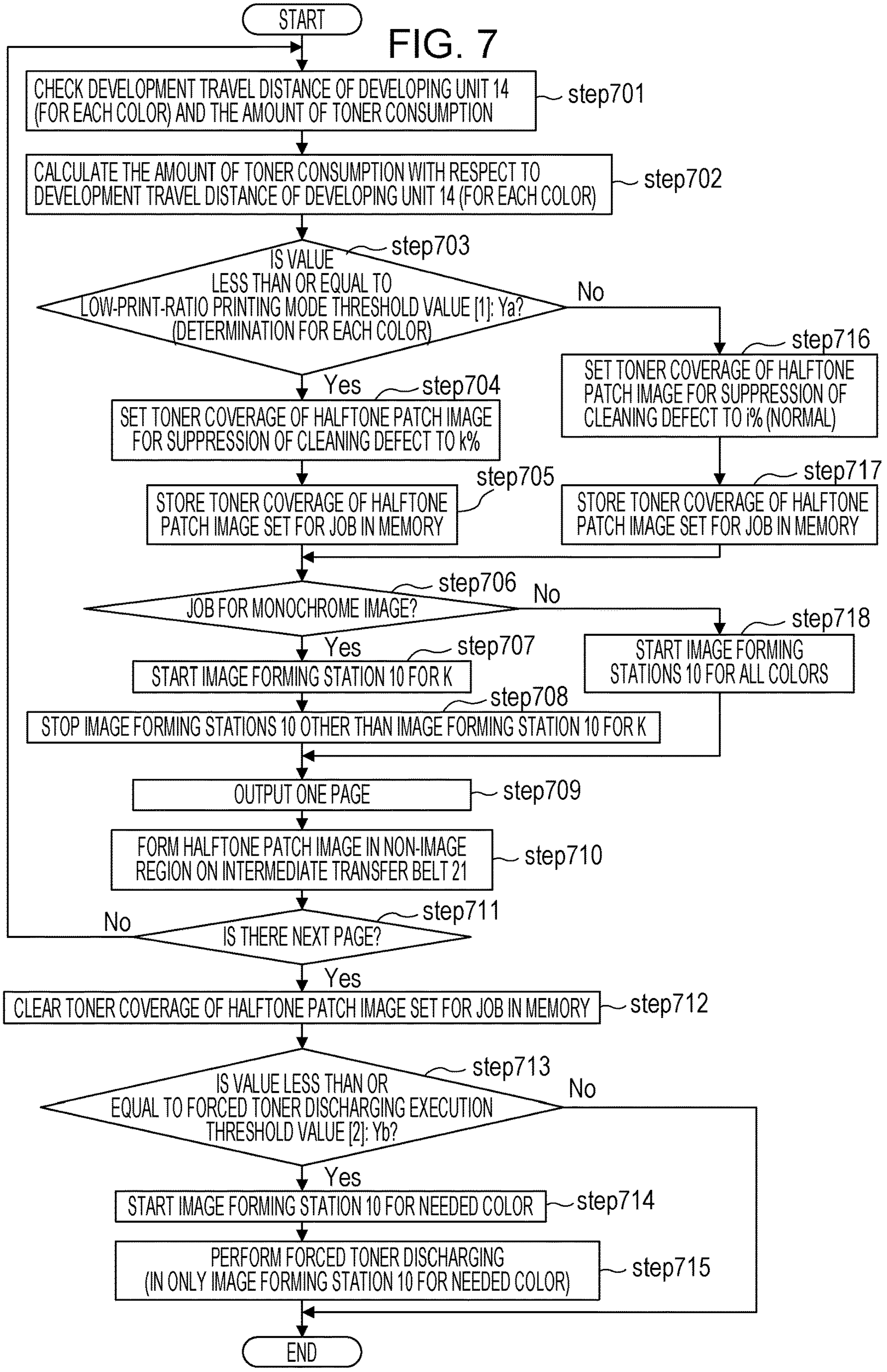
FIG. 7 is a flowchart describing an exemplary control process according to a third embodiment.

Next, an example of control for the low-print-ratio printing mode in the third embodiment will be described with reference to the flowchart in FIG. 7. The control in FIG. 7 is performed by causing the CPU 110 to read a control program stored in the ROM 102 or the RAM 103 and control various components.

At the timing when job data is transmitted from the personal computer 200 and the sheet P is conveyed to the registration roller pair 5, the development travel distance of the developing unit 14 and the amount of toner consumption are checked for each of Y, M, C, and K colors (step 701). Subsequently, the image forming control unit 104 calculates for each color the amount of toner consumption with respect to the development travel distance of the developing unit 14 (step 702). It is checked whether the calculated value is less than or equal to the low-print-ratio printing mode threshold value [1]: Ya (step 703). When the calculated value is less than or equal to Ya, the toner coverage of a halftone patch image for the suppression of a cleaning defect is set to k % (step 704). Subsequently, the toner coverage of a halftone patch image set for the job is stored in a memory (step 705). On the other hand, when the calculated value is greater than the low-print-ratio printing mode threshold value [1]: Ya (step 703), the toner coverage of a halftone patch image for the suppression of a cleaning defect is set to i % (step 716). Subsequently, the toner coverage of a halftone patch image set for the job is stored in the memory (step 717). Subsequently, it is determined whether transmitted job data is a monochrome job (step 706). When the job data is a monochrome job, the image forming station 10 for K is started (step 707) and the image forming stations 10 other than the image forming station 10 for K are stopped (step 708). When the job data is a color image in the determination of whether job data is a monochrome job (step 706), the image forming stations 10 for all colors are started (step 718). Subsequently, one page is output (step 709). After the output of one page (step 709), a halftone patch image is formed in the non-image region on the intermediate transfer belt 21 (step 710). When there is the next page (step 711), the process returns to step 701. When there is not the next page (step 711), the toner coverage of a halftone patch image set for the job is cleared from the memory (step 712).

Subsequently, it is checked whether the value is less than or equal to the forced toner discharging execution threshold value [2]: Yb for the extremely-low-print-ratio output (step 713). When the value is less than or equal to the forced toner discharging execution threshold value [2]: Yb, the image forming station 10 for a corresponding color for which the forced toner discharging needs to be performed is started (step 714), the forced toner discharging is performed (step 715), and the job ends. When the amount of toner consumption is greater than Yb (No in step 713), the job ends without the execution of the forced toner discharging.

As described above, when it is determined whether the forced toner discharging operation needs to be performed in post rotation, the image forming station 10 for a corresponding color for which the forced toner discharging operation needs to be performed is started from the shutdown state at this timing.

By performing the forced toner discharging operation after the startup, downtime can be reduced.

Other Embodiments

The present disclosure is not limited to the embodiments described above. Various variations (including an organic combination of the embodiments) can be made on the basis of the spirit of the present disclosure, and the various variations should not be excluded from the scope of the present disclosure.

In the embodiments described above, an exemplary case has been described where an image forming apparatus includes the intermediate transfer belt 21 as illustrated in FIG. 1. However, the present disclosure may be applied to an image forming apparatus that performs development by directly making the sheet P in contact with the photosensitive drum 11.

In the embodiments described above, an image forming apparatus using a one-component development method has been described. However, the present disclosure may be applied to an image forming apparatus using a two-component development method.

Embodiment(s) of the present disclosure can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-160971 filed Sep. 30, 2021, which is hereby incorporated by reference herein in its entirety.

What is claimed is:

1. An image forming apparatus to execute an image forming job of forming images on a plurality of recording media, the image forming apparatus comprising:

an image forming unit that includes an image carrier on which an electrostatic image is formed, a development container configured to accommodate a developer including toner, and a developer carrier that is rotatable, configured to carry the developer to develop the electrostatic image formed on the image carrier, and configured to form a toner image on the image carrier;

an intermediate transfer member that is moveable and configured to receive transfer of the toner image formed on the image carrier by the image forming unit;

a cleaning member configured to contact the intermediate transfer member to clean toner remaining on the intermediate transfer member; and a control unit configured to perform control, wherein, when a ratio of an amount of toner consumed in the image forming job to a distance that the developer carrier is rotationally driven in the image forming job is greater than a predetermined threshold value, the control unit controls the image forming unit in the image forming job such that a first toner supply image for supplying toner to the cleaning member is formed in a predetermined period each time a toner image for an image to be formed on a single recording medium is transferred to the intermediate transfer member, the predetermined period being from (i) a time at which a first toner image for an image to be formed on a first recording medium is transferred to the intermediate transfer member to (ii) a time at which a second toner image for an image to be formed on a second recording medium subsequent to the first recording medium is transferred to the intermediate transfer member in the image forming job, wherein, in a case where the ratio is less than the predetermined threshold value, the control unit controls the image forming unit in the image forming job such that a second toner supply image for supplying toner to the cleaning member is formed in the predetermined period each time the toner image for the image to be formed on the single recording medium is transferred to the intermediate transfer member, and wherein a density of the second toner supply image is higher than a density of the first toner supply image.

2. The image forming apparatus according to claim 1, wherein the second toner supply image is equal in area to the first toner supply image, and wherein a toner coverage with respect to an area of the second toner supply image is higher than a toner coverage with respect to an area of the first toner supply image.

3. The image forming apparatus according to claim 1, wherein the second toner supply image is equal in length to the first toner supply image in a direction in which the intermediate transfer member moves.

4. An image forming apparatus to execute an image forming job of forming images on a plurality of recording media, the image forming apparatus comprising:

an image forming unit that includes an image carrier on which an electrostatic image is formed, a development container configured to accommodate a developer including toner, and a developer carrier that is rotatable, configured to carry the developer to develop the electrostatic image formed on the image carrier, and configured to form a toner image on the image carrier;

an intermediate transfer member that is moveable and configured to receive transfer of the toner image formed on the image carrier by the image forming unit;

a first cleaning member configured to contact the intermediate transfer member to clean toner remaining on the intermediate transfer member;

a second cleaning member configured to contact the image carrier to clean toner remaining on the image carrier; and a control unit configured to perform control, wherein, in a case where a ratio of an amount of toner consumed in the image forming job to a distance that the developer carrier is rotationally driven in the image forming job is greater than a first threshold value, the control unit controls the image forming unit in the image forming job such that a first toner supply image for supplying toner to the first cleaning member is formed in a predetermined period, the predetermined period being from (i) a time at which a first toner image for an image to be formed on a first recording medium is transferred to the intermediate transfer member to (ii) a time at which a second toner image for an image to be formed on a second recording medium subsequent to the first recording medium is transferred to the intermediate transfer member in the image forming job, wherein, in a case where the ratio is less than the first threshold value and is greater than a second threshold value which is less than the first threshold value, the control unit controls the image forming unit in the image forming job such that a second toner supply image for supplying toner to the first cleaning member is formed in the predetermined period, wherein, in a case where the ratio is less than the second threshold value, the control unit controls the image forming unit in the image forming job such that the image forming job is interrupted and a third toner supply image for supplying toner to the second cleaning member is formed in a state in which the image forming job is interrupted, and wherein a density of the second toner supply image is higher than a density of the first toner supply image.

5. The image forming apparatus according to claim 4, wherein the second toner supply image is equal in area to the first toner supply image, and wherein a toner coverage with respect to an area of the second toner supply image is higher than a toner coverage with respect to an area of the first toner supply image.

6. The image forming apparatus according to claim 4, wherein the second toner supply image is equal in length to the first toner supply image in a direction in which the intermediate transfer member moves.

7. The image forming apparatus according to claim 4, wherein, in a case where the ratio is greater than the first threshold value, the control unit controls the image forming unit in the image forming job such that the first toner supply image is formed in the predetermined period each time a toner image for an image to be formed on a single recording medium is transferred to the intermediate transfer member, and wherein, in a case where the ratio is less than the first threshold value and is greater than the second threshold value, the control unit controls the image forming unit in the image forming job such that the second toner supply image is formed in the predetermined period each time the toner image for the image to be formed on the single recording medium is transferred to the intermediate transfer member.

8. The image forming apparatus according to claim 4, wherein the image forming unit includes an exposure unit configured to expose the image carrier to form the electrostatic image on the image carrier, and wherein the image forming unit forms a toner image for the third toner supply image on the image carrier by causing the exposure unit to expose an entire region of the image carrier.

9. The image forming apparatus according to claim 4, wherein, in a case where the ratio is less than the second threshold value, the control unit controls the image forming unit in the image forming job such that the image forming job is interrupted, the image carrier is made apart from the intermediate transfer member, and the third toner supply image is formed in a state in which the image forming job is interrupted and the image carrier is apart from the intermediate transfer member.

* * * * *